United States Patent [19]
Gomi et al.

[11] Patent Number: 5,475,869
[45] Date of Patent: Dec. 12, 1995

[54] RADIO BASE STATION CAPABLE OF DISTINGUISHING BETWEEN INTERFERENCE DUE TO COLLISIONS OF OUTGOING CALL SIGNALS AND AN EXTERNAL INTERFERENCE NOISE

[75] Inventors: Masatoshi Gomi; Toshitaro Harada, both of Tokyo, Japan

[73] Assignee: NEC Corporation, Japan

[21] Appl. No.: 250,161

[22] Filed: May 27, 1994

[30] Foreign Application Priority Data

May 28, 1993 [JP] Japan .................................. 5-126494

[51] Int. Cl.$^6$ ................................ H04Q 7/30; H04Q 7/34
[52] U.S. Cl. .................................................. 455/63; 379/58
[58] Field of Search ............................. 379/58; 455/54.1, 455/54.2, 63, 67.1, 67.3

[56] References Cited

U.S. PATENT DOCUMENTS

| | | | |
|---|---|---|---|
| 4,234,952 | 11/1980 | Gable et al. | 370/94 |
| 4,392,242 | 7/1983 | Kai | 455/56.1 |
| 5,022,046 | 6/1991 | Morrow, Jr. | 375/1 |
| 5,119,375 | 6/1992 | Paneth et al. | 379/59 |
| 5,394,433 | 2/1995 | Bantz et al. | 375/202 |
| 5,412,659 | 5/1995 | Fujita et al. | 370/95.1 |

FOREIGN PATENT DOCUMENTS 0089853  3/1983  European Pat. Off. .

*Primary Examiner*—Dwayne D. Bost
*Attorney, Agent, or Firm*—Ostrolenk, Faber, Gerb & Soffen

[57] ABSTRACT

In a mobile communication system having a radio base station (14A), a plurality of mobile stations connected to the radio base station via at least one control channel, and a radio exchange station (15) connected to the radio base station, the radio base station (14A) has an interference detecting section (14A-1) connected to the control channel and the radio exchange station and a storage section (14A-2) connected to the interference detecting section. The interference detecting section (14A-1) detects an interference in the control channel to distinguish between interference noises inputted thereto as an external interference wave and an interference signal due to collision of outgoing call signals by the mobile stations. The storage section (14A-2) stores standard threshold values for distinguishing between the interference noise and the interference signal. The storage section (14A-2) supplies the standard threshold values to the interference detecting section in a predetermined procedure.

7 Claims, 3 Drawing Sheets

RADIO BASE STATION CAPABLE OF DISTINGUISHING BETWEEN INTERFERENCE DUE TO COLLISIONS OF OUTGOING CALL SIGNALS AND AN EXTERNAL INTERFERENCE NOISE

BACKGROUND OF THE INVENTION

This invention relates to a radio base station for use in a mobile digital communication system and, in particular, to a method of detecting interference in a control channel.

As well known in the art, the mobile digital communication system comprises a plurality of mobile stations sprinkled over a zone, a radio base station, and a radio exchange station. The radio base station is connected to the mobile stations via a control channel and a plurality of speech channels. The radio base station carries out radio communication to the mobile stations. More specifically, the radio base station sets a particular one of the speech channels for each mobile station to carry out a transmission of a communication signal via the particular speech channel. After the particular speech channel is set, the radio exchange station carries out an exchange connection for a desired subscriber.

A control signal for an outgoing call or an incoming call is transferred between the radio base station and the mobile stations via the control channel. The radio exchange station carries out control of the control signal. That is, the radio exchange station carries out, through the control channel, designation of free channels in the speech channels, outgoing/incoming call, exchange operation for a communication destination and so on. Inasmuch as a transferring time interval for the control signal is usually equal to a time interval of about 10 milliseconds in a digital exchange, there is very few opportunities for collisions although outgoing/incoming calls for the mobile stations are congested. However, when the radio base station receives via the control channel an interference electric wave having a relatively longer time interval extremely more than 10 milliseconds due to an external electric wave except for the mobile stations, it is feared that normal communication of the control signal is interfered.

SUMMARY OF THE INVENTION

It is an object of this invention to provide a radio base station, which is capable of distinguishing between interference due to collisions of outgoing call signals caused by simultaneous transmission from a plurality of mobile stations and an external interference noise.

Other objects of this invention will become clear as the description proceeds.

According to an aspect of this invention, a radio base station is for use in a mobile communication system which comprises a plurality of mobile stations connected to the radio base station via at least one control channel and a radio exchange station connected to the radio base station. The radio base station comprises an interference detecting section and a storage section. Connected to the control channel and the radio exchange station, the interference detecting section detects an interference in the control channel to distinguish between interference noises inputted thereto as an external interference wave and an interference signal due to collisions of outgoing call signals by the mobile stations. Connected to the interference detecting section, the storage section stores standard threshold values for distinguishing between the interference noises and the interference signal. The storage section supplies the standard threshold values to the interference detecting section in a predetermined procedure.

According to a different aspect of this invention, an interference detecting method is of detecting interference in a control channel arranged between a plurality of mobile stations and a radio base station. A control signal is transferred between the mobile stations and a radio exchange station via the radio base station and the control channel. The interference detecting method comprises the steps of: (a) detecting, in the radio base station, the interference in the control channel; (b) initializing, in the radio base station, a continuous interference occurrence number to zero when the interference is detected at the step (a); (c) initializing, in the radio base station, an intermittent interference occurrence number to zero after the step (b); (d) setting, in the radio base station, a first timer interval in a first timer after the step (c); (e) incrementing, in the radio base station, the continuous interference occurrence number by one after the step (d); (f) putting the radio base station into a waiting state after the step (e): (g) stopping, in the radio base station, the first timer and a second timer when the interference is detected in the waiting state; (h) incrementing, in the radio base station, the continuous interference occurrence number by one after the step (g); (i) comparing, in the radio base station, the continuous interference occurrence number with a first predetermined number after the step (h); (j) delivering from the radio base station to the radio exchange station an interference information signal indicative of the continuous interference noise when the continuous interference occurrence number is not less than the first predetermined number; (k) setting, in the radio base station, the first timer interval in the first timer again when the continuous interference occurrence number is less than the first predetermined number; (1) turning back to the step (f) from the step (k) thereby making the radio base station put into the waiting state again; (m) comparing, in the radio base station, the continuous interference occurrence number with a second predetermined number when the first timer interval elapses in the first timer in the waiting state; (n) incrementing, in the radio base station, the intermittent interference occurrence number by one when the continuous interference occurrence number is not less than the second predetermined number; (o) comparing, in the radio base station, the intermittent interference occurrence number with a third predetermined number after the step (n); (p) delivering from the radio base station to the radio exchange station the interference information signal indicative of the intermittent interference noise when the intermittent interference occurrence number is not less than the third predetermined number; (q) initializing, in the radio base station, the continuous interference occurrence number to zero again when the intermittent interference occurrence number is less than the third predetermined number; (r) setting, in the radio base station, a second timer interval in the second timer after the step (q); (s) turning back to the step (f) from the step (r) thereby making the radio base station put into the waiting state again; (t) deciding, in the radio base station, on an interference signal due to collisions of outgoing call signals by the mobile stations when the continuous interference occurrence number is less than the second predetermined number at the step (m) and thereby carrying out the subsequent interference detection operation without delivery of the interference information signal to the radio exchange station; and (u) deciding, in the radio base station, on the interference signal due to collisions of the outgoing call signals by the mobile stations when the second timer interval elapses in the second timer in the waiting state and thereby carrying out the subsequent interference detection operation without delivery of the interference information signal to the! radio exchange station.

DESCRIPTION OF THE PREFERRED EMBODIMENTS

Figure 1:
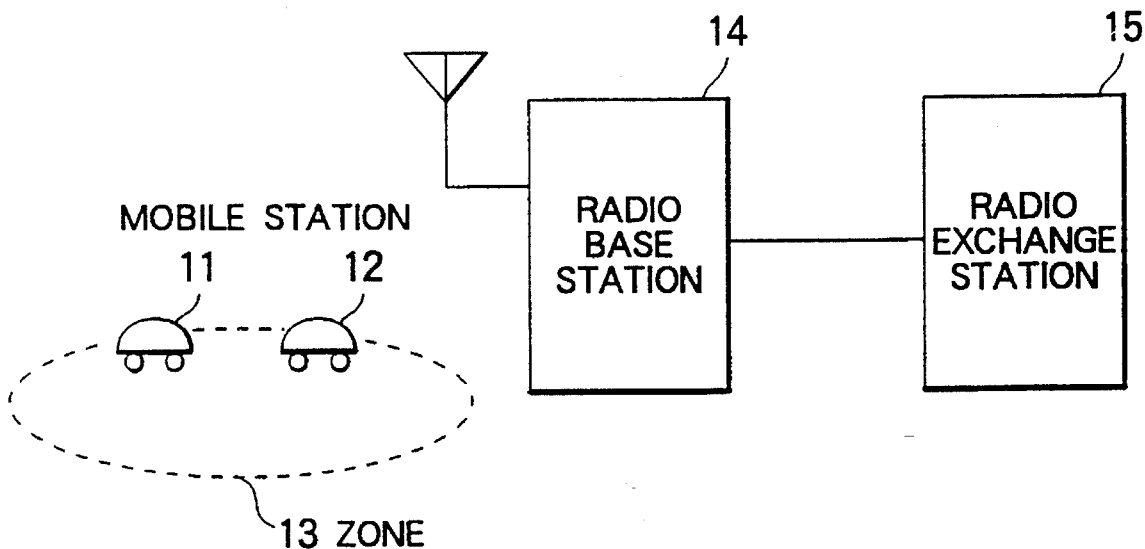
FIG. 1 is a block diagram of a mobile digital communication system including a conventional radio base station.
Figure 2:
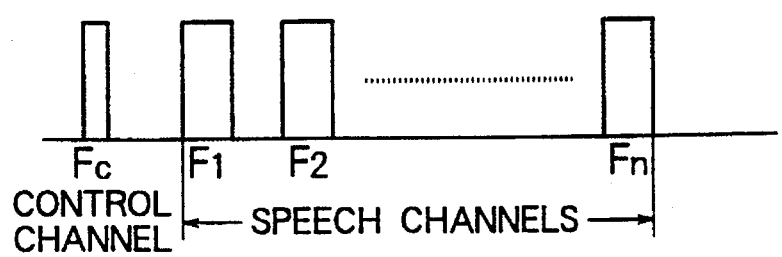
FIG. 2 shows a frequency arrangement of a control channel and a plurality of speech channels.

Referring to FIGS. 1 and 2, a conventional radio base station for use in a mobile digital communication system. The mobile digital communication system comprises first and second mobile stations 11 and 12 sprinkled over a zone 13, the radio base station labelled 14, and a radio exchange station 15.

As shown in FIG. 2, the radio base station 14 is connected to the first and the second mobile stations 11 and 12 via a control channel Fc and first through n-th speech channels F1, F2, . . . , and Fn where n represents an integer which is not less than two.

The radio base station 14 carries out radio communication to the mobile stations. More specifically, the radio base station 14 sets a particular one of the speech channels for each mobile station to carry out a transmission of a communication signal via the particular speech channel. After the particular speech channel is set, the radio exchange station 15 carries out an exchange connection for a desired subscriber (not shown).

A control signal for an outgoing call or an incoming call is transferred between the radio base station 14 and the first and the second mobile stations 11 and 12 via the control channel Fc. The radio exchange station 15 carries out control of the control signal. That is, the radio exchange station 15 carries out, through the control channel, designation of free channels in the speech channels, outgoing/incoming call, exchange operation for a communication destination and so on. Inasmuch as a transferring time interval for the control signal is usually equal to a time interval of about ten milliseconds in a digital exchange, there is very few opportunities for collisions although outgoing/incoming call signals for the first and the second mobile stations 11 and 12 are congested. However, when the radio base station 14 receives via the control channel Fc an interference electric wave having a relatively longer time interval extremely more than ten milliseconds due to an external electric wave except for the first and the second mobile stations 11 and 12, it is feared that normal communication of the control signal is interfered.

Figure 3:
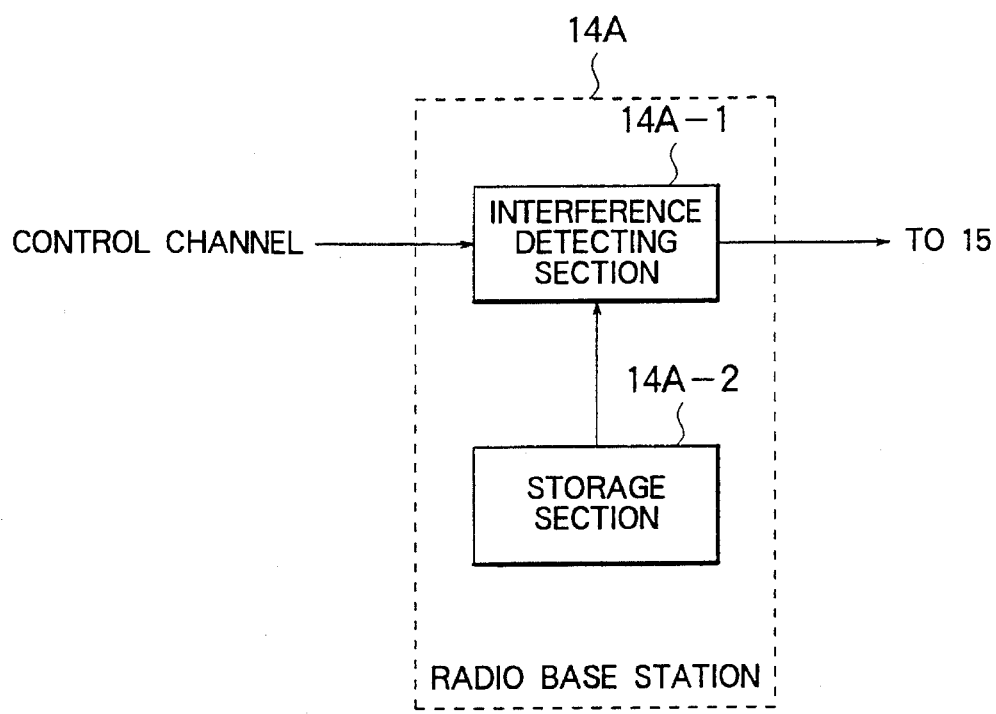
FIG. 3 is a block diagram of a radio base station according to an embodiment of this invention.

Referring to FIG. 3, description will proceed to a radio base station 14A according to an embodiment of this invention. The radio base station 14A comprises an interference detecting section 14A-1 and a storage section 14A-2.

The interference detecting section 14A-1 is connected to the control channel Fc (FIG. 2) and the mobile exchange station 15 (FIG. 1). The interference detecting section 14A-1 detects interferences in the control channel Fc to distinguish between interference noises inputted thereto as an external interference wave and an interference signal due to collisions of outgoing call signals by the first and the second mobile stations 11 and 12 (FIG. 1). In the manner which will later become clear, the interference noises are classified into a continuous interference noise and an intermittent interference noise which comprises a plurality of burst noises. The interference detecting section 14A-1 delivers to the mobile exchange station 15 an interference information signal indicative of one of the continuous interference noise and the intermittent interference noise.

The storage section 14A-2 is connected to the interference detecting section 4A-1. The storage section 14A-2 stores standard threshold values for distinguishing among the continuous interference noise, the intermittent interference noise, and the interference signal. The storage section 14A-2 supplies the standard threshold values to the interference detecting section 14A-1 in a predetermined procedure in the manner which will become clear.

With this structure, it is possible to distinguish between the interference signal due to collisions of outgoing call signals caused by simultaneous transmission from the first and the second mobile stations 11 and 12 and the external interference noise.

Figure 4:
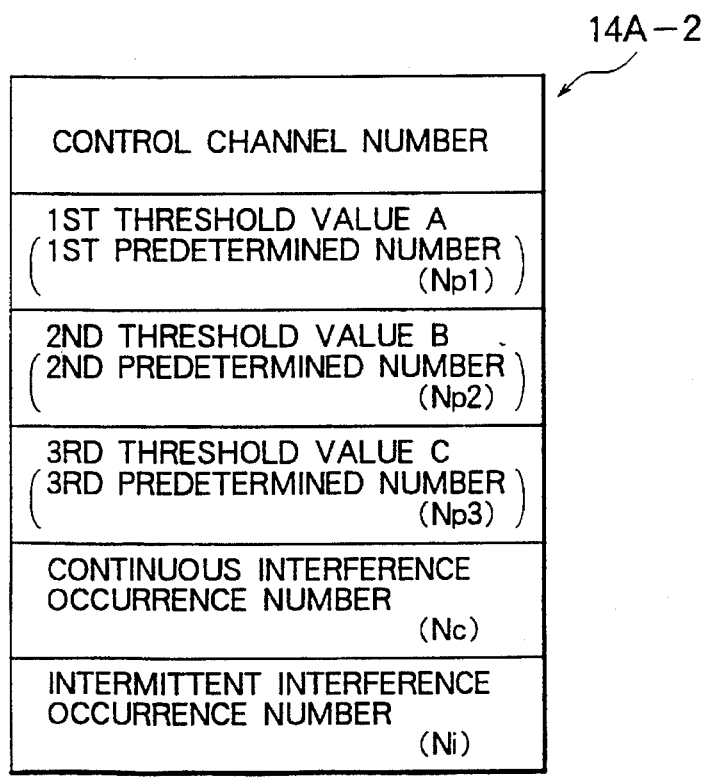
FIG. 4 shows contents stored in a storage section for use in the radio base station illustrated in FIG. 3.

Turning to FIG. 4, the storage section 14A-2 stores a control channel number indicative of an active one of control channels when the control channels are equal in number to two or more, first through third threshold values A, B, and C for defining permissible ranges of the interferences, and first and second occurrence numbers of the interferences. More specifically, the first threshold value A indicates a first predetermined number Np1 for defining a continuous interference time interval of the continuous interference noise. The second threshold value B indicates a second predetermined number Np2 for defining a burst time interval of each of the burst noises in the intermittent interference noise. The third threshold value C indicates a third predetermined number Np3 for defining the burst number of the burst noises in the intermittent interference noise. In the example being illustrated, the first through the third predetermined numbers Np1, Np2, and Np3 indicated by the first through the third threshold values A, B, and C are equal to fifty, ten, and five, respectively. The first occurrence number indicates the occurrence number which corresponds to the continuous interference time interval for the continuous interference noise and is herein called a continuous interference occurrence number Nc for short. The second occurrence number indicates the occurrence number of the burst signals for the intermittent interference noise and is herein called an intermittent interference occurrence number Ni for short.

Figure 5:
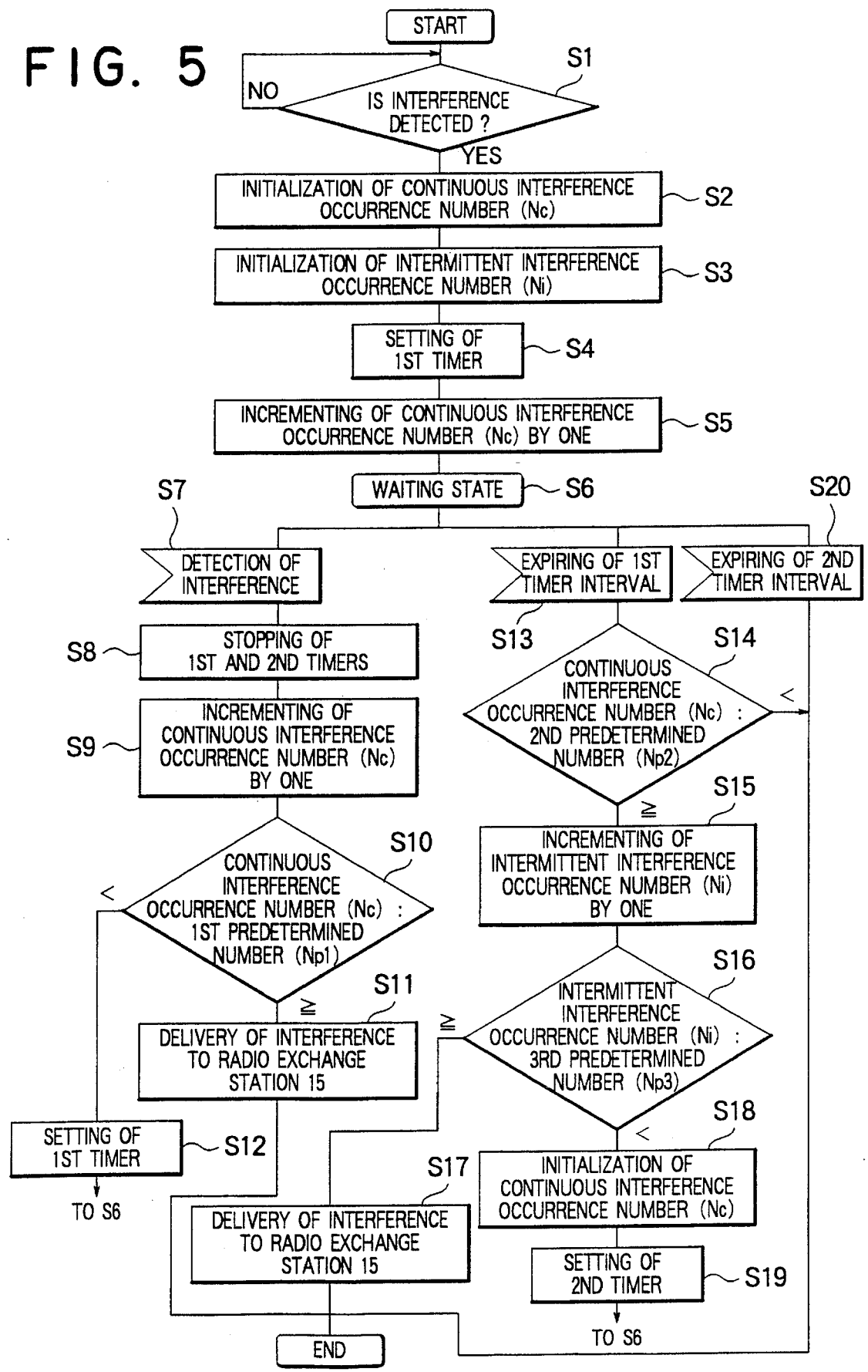
FIG. 5 is a flow chart for use in describing operation of an interference detecting section in the radio base station illustrated in FIG. 3.

Referring to FIG. 5, description will be made as regards operation of the interference detecting section 14A-1. It will be assumed as follows. The interference detecting section 14A-1 has a processing period of ten milliseconds. The interference detecting section 14A-1 decides on the continuous interference noise when the interference continues for a continuous time interval which is not less than five hundreds milliseconds. The interference detecting section 14A-1 decides on the intermittent interference noise when receives five or more burst noises wherein each burst noise has a burst time interval which is not less than one hundred milliseconds and a pause time interval between two adjacent burst noises is less than five seconds. The interference detecting section 14A-1 comprises first and second timers (not shown). The first timer is used for defining a repeat period for interference detection that is equal to the processing period. The second timer is used for defining the pause time interval.

At first, the interference detecting section 14A-1 detects an interference in a demodulated signal, namely, an external interference noise which does not conform to protocol of an outgoing call signal by the mobile station or an interference signal by other mobile stations except that the mobile station from which the interference detecting section 14A-1 initially receives the outgoing call signal (a first step S1). When the interference detecting section 14A-1 detects no interference, the interference detecting section 14A-1 uninterruptedly carries out operation of interference detection in the first step S1.

When the interference is detected, the first step S1 is succeeded by a second step S2 at which the interference detecting section 14A-1 initializes the continuous interference occurrence number Nc to zero. The second step S2 is followed by a third step S3 at which the interference detecting section 14A-1 initializes the intermittent interference occurrence number Ni to zero. The third step S3 proceeds to a fourth step S4 at which he interference detecting section 14A-1 sets a first timer interval of ten milliseconds in the first timer. The fourth step S4 is succeeded by a fifth step S5 at which the interference detecting section 14A-1 increments the continuous interference occurrence number Nc by one. The fifth step S5 is followed by a sixth step S6 at which the interference detecting section 14A-1 is put into a waiting state.

When the interference is detected in the waiting state at a seventh step S7, the interference detecting section 14A-1 stops the first timer at an eighth step S8. In this connection, if the second timer is set, the interference detecting section 14A-1 stops the second timer at the eighth step S8. The eighth step S8 proceeds to a ninth step S9 at which the interference detecting section 14A-1 increments the continuous interference occurrence number Nc by one. The step S9 is succeeded by a tenth step S10 at which the interference detecting section 14A-1 compares the continuous interference occurrence number Nc with the first predetermined number Np1 or fifth indicated by the first threshold value A. When the continuous interference occurrence number Nc is not less than the first predetermined number Np1, the tenth step S10 is followed by an eleventh step S11 at which the interference detecting section 14A-1 delivers to the mobile exchange station 15 (FIG. 1) the interference information signal indicative of the continuous interference noise. If the continuous interference occurrence number Nc is less than the first predetermined number Np1, the tenth step S10 is followed by a twelfth step S12 at which the interference detecting section 14A-1 sets the first timer interval of ten milliseconds in the first timer again. The twelfth step S12 is turned back to the sixth step S6 at which the interference detecting section 14A-1 is put into the waiting state again.

In the sixth through the twelfth steps S6 to S12, it is possible for the interference detecting section 14A-1 to distinguish the Continuous interference noise from the interferences. In other words, the interference detecting section 14A-1 serves as a continuous interference noise decision arrangement for deciding on the continuous interference noise in the sixth through the twelfth steps S6 to S12.

When the first timer interval expires in the first timer in the waiting state at a thirteenth step S13, the interference detecting section 14A-1 compares the continuous interference occurrence number Nc with the second predetermined number Np2 or ten indicated by the second threshold value B at a fourteenth step S14. When the continuous interference occurrence number Nc is not less than the second predetermined number Np2, the fourteenth step S14 is followed by a fifteenth step S15 at which the interference detecting section 14A-1 increments the intermittent interference occurrence number Ni by one. The fifteenth step S15 is followed by a sixteenth step S16 at which the interference detecting section 14A-1 compares the intermittent interference occurrence number Ni with the third predetermined number Np3 or five indicated by the third threshold value C. When the intermittent interference occurrence number Ni is not less than the third predetermined number Np3, the sixteenth step S16 proceeds to a seventeenth step S17 at which the interference detecting section 14A-1 delivers to the mobile exchange station 15 (FIG. 1) the interference information signal indicative of the intermittent interferences noise. If the intermittent interference occurrence number Ni is less than the third predetermined number Np3, the sixteenth step S16 is succeeded by an eighteenth step S18 at which the interference detecting section 14A-1 initializes the continuous interference occurrence number Nc to zero again. The eighteenth step S18 is followed by a nineteenth step S19 at which the interference detecting section 14A-1 sets the second timer interval of five seconds in the second timer. The nineteenth step S19 is turned back to the sixth step S6 at which the interference detecting section 14A-1 is put into the waiting state again.

If the continuous interference occurrence number Nc is less than the second predetermined number Np2 at the fourteenth step S14, the interference detecting section 14A-1 decides on the interference signal due to collisions of the outgoing call signals by the mobile stations and thereby carries out the subsequent interference detection operation without delivery of the interference information signal to the mobile exchange station 15. In addition, when the second timer interval expires in the second timer in the waiting state at a twentieth step S20, the interference detecting section 14A-1 decides on the interference signal due to collisions of the outgoing call signals by the mobile stations and thereby carries out the subsequent interference detection operation without delivery of the interference information signal to the mobile exchange station 15.

In the sixth step S6 and the thirteenth through the twentieth steps S13 to S20, it is possible for the interference detecting section 14A-1 to distinguish between the intermittent interference noise and the interference signal. In other words, the interference detecting section 14A-1 serves as an intermittent interference noise decision arrangement for deciding on the intermittent interference noise in the sixth step S6 and the thirteenth through the twentieth steps S13 to S20.

While this invention has thus far been described in conjunction with a preferred embodiment thereof, it will now be readily possible for those skilled in the art to put this invention into practice in various other manners. For example, the interference detecting section 14A-1 may be connected to each mobile station via a plurality of control channels. In this event, one of the control channels is used as an active one while others are used as backup ones. A control signal is transferred between each mobile station and the interference detecting section 14A-1 via the active control channel. Under the circumstances, the interference detecting section 14A-1 may comprise a switching arrangement for switching the active control channel with a backup control channel when the interference detecting section 14A-1 detects either the continuous interference noise or the intermittent interference noise in the active control channel.

What is claimed is:

1. A radio base station for use in a mobile communication system comprising a plurality of mobile stations connected to said radio base station via at least one control channel and a radio exchange station connected to said radio base station, said radio base station comprising:

interference detecting means, connected to the control channel and said radio exchange station, for detecting an interference in the control channel to distinguish between interference noises inputted thereto as an external interference wave and an interference signal due to collision of outgoing call signals by the mobile stations; and storage means, connected to said interference detecting means, for storing standard threshold values for distinguishing between the interference noises and the interference signal, said storage means supplying the standard threshold values to said interference detecting means in a predetermined procedure.

2. A radio base station as claimed in claim 1, wherein the interference noises are classified into a continuous interference noise and an intermittent interference noise which comprises a plurality of burst noises, the standard threshold values including:

a first threshold value indicative of a first predetermined number for defining a continuous interference time interval of the continuous interference noise;

a second threshold value indicative of a second predetermined number for defining a burst time interval of each of the burst noises in the intermittent interference noise; and a third threshold value indicative of a third predetermined number for defining the burst number of the burst noises in the intermittent interference noise.

3. A radio base station as claimed in claim 2, wherein said interference detecting means comprises:

means for delivering to said radio exchange station an interference information signal indicative of the continuous interference noise when a continuous interference occurrence number is not less than the first predetermined number; and means for delivering to said radio exchange station the interference information signal indicative of the intermittent interference noise when the continuous interference occurrence number is not less than the second predetermined number and when an intermittent interference occurrence number is not less than the third predetermined number.

4. A radio base station for use in a mobile communication system comprising a plurality of mobile stations connected to said radio base station via at least one control channel and a radio exchange station connected to said radio base station, said radio base station comprising:

an interference detecting section, connected to the control channel and said radio exchange station, for detecting an interference in the control channel to distinguish between interference noises inputted thereto as an external interference wave and an interference signal due to collision of outgoing call signals by the mobile stations; and a storage section, connected to said interference detecting section, for storing standard threshold values for distinguishing between the interference noise and the interference signal, said storage section supplying the standard threshold values to said interference detecting section in a predetermined procedure.

5. A radio base station as claimed in claim 4, wherein the interference noises are classified into a continuous interference noise and an intermittent interference noise which comprises a plurality of burst noises, the standard threshold values including:

a first threshold value indicative of a first predetermined number for defining a continuous interference time interval of the continuous interference noise;

a second threshold value indicative of a second predetermined number for defining a burst time interval of each of the burst noises in the intermittent interference noise; and a third threshold value indicative of a third predetermined number for defining the burst number of the burst noises in the intermittent interference noise.

6. A radio base Station as claimed in claim 5, wherein said interference detecting section comprises:

a first part for delivering to said radio exchange station an interference information signal indicative of the continuous interference noise when a continuous interference occurrence number is not less than the first predetermined number; and a second part for delivering to said radio exchange station the interference information signal indicative of the intermittent interference noise when the continuous interference occurrence number is not less than the second predetermined number and when an intermittent interference occurrence number is not less than the third predetermined number.

7. A method of detecting interference in at least one control channel arranged between a plurality of mobile stations and a radio base station, a control signal being transferred, between said mobile stations and a radio exchange station via said radio base station and the control channel, said method comprising the steps of:

(a) detecting, in said radio base station, the interference in the control channel;

(b) initializing, in said radio base station, a continuous interference occurrence number to zero when the interference is detected at the step (a);

(c) initializing, in said radio base station, an intermittent interference occurrence number to zero after the step (b);

(d) setting, in said radio base station, a first timer interval in a first timer after the step (c);

(e) incrementing, in said radio base station, the continuous interference occurrence number by one after the step (d);

(f) putting said radio base station into a waiting state after the step (e);

(g) stopping, in said radio base station, the first timer and a second timer when the interference is detected in the waiting state;

(h) incrementing, in said radio base station, the continuous interference occurrence number by one after the step (g);

(i) comparing, in said radio base station, the continuous interference occurrence number with a first predetermined number after the step (h);

(j) delivering from said radio base station to said radio exchange station an interference information signal indicative of the continuous interference noise when the continuous interference occurrence number is not less than the first predetermined number;

(k) setting, in said radio base station, the first timer interval in the first timer again when the continuous interference occurrence number is less than the first predetermined number;

(l) turning back to the step (f) from the step (k) thereby making said radio base station put into the waiting state again;

(m) comparing, in said radio base station, the continuous interference occurrence number with a second predetermined number when the first timer interval expires in the first timer in the waiting state;

(n) incrementing, in said radio base station, the intermittent interference occurrence number by one when the continuous interference occurrence number is not less than the second predetermined number;

(o) comparing, in said radio base station, the intermittent interference occurrence number with a third predetermined number after the step (n)

(p) delivering from said radio base station to said radio exchange station the interference information signal indicative of the intermittent interference noise when the intermittent interference occurrence number is not less than the third predetermined number;

(q) initializing, in said radio base station, the continuous interference occurrence number to zero again when the intermittent interference occurrence number is less than the third predetermined number;

(r) setting, in said radio base station, a second timer interval in the second timer after the step (q);

(s) turning back to the step (f) from the step (r) thereby making said radio base station put into the waiting state again;

(t) deciding, in said radio base station, on an interference signal due to collisions of outgoing call signals by the mobile stations when the continuous interference occurrence number is less than the second predetermined number at the step (m) and thereby carrying out the subsequent interference detection operation without delivery of the interference information signal to said radio exchange station; and (u) deciding, in said radio base station, on the interference signal due to collisions of the outgoing call signals by the mobile stations when the second timer interval expires in the second timer in the waiting state and thereby carrying out the subsequent interference detection operation without delivery of the interference information signal to said radio exchange station.

* * * * *